July 11, 1972    R. E. MISHLER    3,676,212
PRODUCTION OF RESISTIVE COATINGS
Filed March 10, 1970    7 Sheets-Sheet 1

INVENTOR
RALPH E. MISHLER
BY John Phillips Ryan
ATTORNEY

July 11, 1972   R. E. MISHLER   3,676,212
PRODUCTION OF RESISTIVE COATINGS
Filed March 10, 1970   7 Sheets-Sheet 3

INVENTOR
RALPH E. MISHLER
BY
ATTORNEY

United States Patent Office 3,676,212
Patented July 11, 1972

3,676,212
PRODUCTION OF RESISTIVE COATINGS
Ralph Ephraim Mishler, Menomonee Falls, Wis., assignor to Globe-Union Inc., Milwaukee, Wis.
Filed Mar. 10, 1970, Ser. No. 18,243
Int. Cl. B44d 1/18
U.S. Cl. 117—212                              19 Claims

ABSTRACT OF THE DISCLOSURE

A method for producing a plurality of side-by-side micro-thin resistive plastic coatings on a dielectric substrate which comprises continuously advancing a dielectric substrate, e.g., a phenolic strip, at a substantially uniform rate along a prescribed path, supporting a plurality of flowable masses of conductive plastic material onto confined portions of the advancing substrate and doctoring each mass to form a micro-thin stripe coating of each material on the substrate as it advances away from each mass; the location of each of the plastic masses supported on the confined portions of the substrate being selected so that the plastic materials doctored onto said substrate form an edge-like continuous uniform electrical junction between each coating, and the viscosity of said plastic materials being sufficient to form continuous substantially uniform edges along each of said coatings.

BACKGROUND OF THE INVENTION

This invention relates to the manufacture of electrically resistive coatings especially suitable for the production of linear and non-linear resistors and the like electrical elements. More particularly this invention relates to a method of applying a plurality of electrically resistive plastic coatings side-by-side on a dielectric substrate to provide a continuous electrical path from one coating to the other, to the coated substrates obtained thereby and to the electrical elements manufactured from these coated substrates.

It is known to produce resistive coatings from flowable plastic materials containing electrically conductive particles dispersed therein. Also many attempts have been made to use these conductive plastic materials to produce two or more electrically resistive coatings adjacent to each other on an insulative substrate, with electrical junctions therebetween in the production of resistor elements, radiant-heating elements and the like. For example, in production of resistor elements, the resistive coatings contain particles of different conductivity. One resistive coating may contain metal particles, e.g., silver, to provide a termination zone of low resistivity whereas an adjacent coating may contain less conductive particles such as carbon to provide a resistor zone of high resistivity.

Several of the known methods for applying conductive plastic materials have met with success, particularly in the preparation of single coatings for use in radiant-heating elements. However, in the production of the micro-thin resistive coatings required for resistor elements in the manufacture of electrical components for radios, televisions, sound reproduction systems and the like electrical equipment, considerable difficulty has been experienced in consistently obtaining coated substrates having two or more coatings with the required electrical performance characteristics. It has been found that the adjacent coatings which are of substantially different resistivity must each have a uniform continuous edge and form a conductive junction between them that provides a continuous electrical path with an even or smooth transition in resistance from one coating to the other. This requirement of a smooth electrical transition zone between coatings of different resistivities is particularly manifest in the production of a resistor element for a potentiometer which has a wiper element that is moved across the resistor element, i.e., from one coating to another. The amount of non-uniformity, i.e., the deviation of resistance occurring at the transition zone or electrical junction between one coating and another, is a critical criterion in the manufacture of such electrical components. Ideally, the changes from one coating to another should be uniform so that the resistance of each coating and the resistance of the electrical junction can be resolved to provide a smooth electrical path across the coatings.

Several application techniques are commonly used in the production of resistive coatings for potentiometers. These include spraying and free-flowing of one or more conductive plastic materials onto a dielectric substrate.

In spray coating, a resistor element is conventionally made by applying one spray coat of conductive plastic material in the form of a stripe through a series of masked openings in a template positioned over a dielectric substrate; drying or precuring this coating; applying a second coat in the form of a stripe through another series of masked openings in a template, in overlapping relationship to the first; and then heating the coatings to cure the plastic material. In order to provide an even transition from one coating to the other it is usually necessary to add one or more subsequent coatings at the zone where the first and second coatings overlap. This technique is often designated as "blending" in the manufacturing of spray deposited resistors. It will be recognized that this coating operation requires consistent and accurate blending of the coatings at the overlapped zones.

Resistors of the desired configuration are then cut, stamped, pressed or otherwise formed from the resulting coated substrate. The spraying technique has a number of disadvantages. For example, the surfaces of the coatings produced are often rough and have a wave-like appearance. Consequently there is a lack of uniformity in the thickness (and resistance) in each coating from one end of the substrate to the other. Also the spraying nozzles used require the use of relatively low viscosity plastic materials. Consequently there is a definite limitation to the thickness of the coatings that may be applied during each pass of the spraying nozzles. Also it is difficult to control the over-spray of the coatings so that the amount of overlapping between adjacent coatings is consistent and uniform along the substrate. There are also a number of other process variables which are difficult to control, e.g., the pressure in the container for the plastic material to be atomized; the atomizing pressure at the spray nozzle; the particle size of the conductive particles dispersed in the plastic material (if the particles are too large they will cause fouling of the nozzles); the viscosity of the conductive plastic material must be relatively low; and the rate of application of the plastic material from the spray nozzle, and the rate of speed of the surface to be coated must be carefully correlated. Because of the difficulty in controlling these process parameters it has been found that coatings produced by this method of application have two particularly objectionable characteristics. Frist, there are poor yields of products, i.e., the tolerance in the change of resistance along the stripe or coating formed by spraying may vary as much as ±30% necessitating rejection of 50% or more of the resistors produced from the coated substrate to a tolerance of ±10%. Also of prime importance, there is a lack of control in the formation of the interfaces or edge contacts between the adjacent coatings which cause excessive jump-off or poor electrical transition between the coatings. This transition is often so uneven that carbon-type resistors produced by this technique are unsatisfactory for high-quality electrical components. Consequently, other more expensive resistors such as cermet-type resistors must be used.

In the free-flowing coating technique a thin layer or film of plastic conductive material is extruded through a slit placed closely adjacent to a dielectric strip or sheet to be coated and the rate of extrusion and the rate of travel of the strip are regulated to apply a continuous coating of the material. The speed of the strip relative to the rate of extrusion through the slot is very difficult to control. This technique also suffers from the disadvantages of producing rough surfaces and coatings with nonuniform thickness along the length of the strip. In fact in this technique it is most difficult to obtain a tolerance of change of resistance along the strip which is within the range of ±10%. Consequently, a great many of the resistors obtained from such coatings must also be rejected. The thickness of the coating applied by this technique is determined by the viscosity of the material being applied, the extrusion pressure, orifice size used, and the speed of the strip relative to the rate of extrusion. If these variables are not properly controlled there is considerable variation in the thickness of the film applied as a coating. Finally, it has been found that the electrical transition zone between adjacent coatings often is uneven.

SUMMARY OF THE INVENTION

Advantageously this invention overcomes many of the problems of the known coating methods in that it provides a method of simultaneously or successively forming a plurality of micro-thin resistive plastic coatings arranged side-by-side in electrical contact on a dielectric substrate which have prescribed thicknesses and a smooth transition zone or electrical junction between each.

Thus this invention contemplates a method for producing a plurality of side-by-side micro-thin resistive plastic coatings on a dielectric substrate which comprises continuously advancing a dielectric substrate at a substantially uniform rate along a prescribed path, supporting a plurality of masses of conductive plastic material onto confined portions of the advancing substrate and doctoring a prescribed thickness of each mass to form a micro-thin coating of each material on the substrate as it advances away from each mass; the location of each of the plastic masses supported on the confined portions of the substrate being selected so that the plastic materials doctored onto said substrate form an edge-like continuous uniform electrical junction between each coating, and the viscosity of the plastic materials being sufficient to produce and maintain substantially linear uniform edges along each of the coatings.

In accordance with this invention it has been found that two or more flowable plastic materials of different conductivity can be simultaneously or sequentially doctored on to a dielectric substrate to produce side-by-side stripe coatings electrically joined together across the width of the substrate by edge-like electrical junctions providing exceptionally even transition from one level of resistivity to another. The electrical junction or transition zones formed by the method of this invention may be described as zones in which one edge of a coating overlaps the edge of another with the edges having reversed tapers. This reversed tapering provides a continuous interface between the coatings from one end of the transition zone to the other; the ends or limits of each zone being defined by distinct lines of demarcation formed by the substantially linear edges of each adjacent coating.

In forming these adjacent coatings a number of process variables must be controlled in order to produce a resistor element having the desired high performance characteristics. Two variables which are especially critical are the viscosity of the conductive plastic material to be applied and control of the location of each of the masses of conductive plastic material on the moving substrate prior to the doctoring operation.

The viscosity of the conductive plastic material must be sufficiently high to insure formation of clean knife-like uniform edges on each coating and must be in a range that allows the material to flow onto the moving substrate. Conductive plastic materials having viscosities of from about 200 centipoises to as high as 50,000 centipoises can be used (these viscosities are obtained at a spindle speed of 10 r.p.m. on a Brookfield Viscosimeter). It will be understood that the manner in which the coatings are applied, i.e., simultaneously or successively, determines the minimum viscosity of the plastic material that can be used. In simultaneous one-pass coatings the viscosity must be sufficiently high to prevent any substantial intermingling of the plastic materials in the transition zone. In general, viscosities of at least about 1,000 cps. (at a Brookfield spindle of 10 r.p.m.) are needed for one pass coatings. Preferably these viscosities range from 3,000 to 20,000 cps.

In addition, it is preferable to utilize conductive plastic materials which exhibit thixtropic properties. These materials are more readily applied by a doctoring edge. Also they insure that the edges between adjacent coatings will provide the even electrical transition from one resistive coating to another.

In general, the index of thixotropy of these materials may vary from about 1.5 to about 40 and preferably from about 2 to about 20. It will be understood that as used herein the term "index of thixotropy" refers to the ratio of the viscosity of a material at one level of agitation to the viscosity at another level. Many of the polymeric materials suitable for this invention may show viscosities of from about 20,000 up to about 800,000 or more when measured at a spindle speed of 0.5 r.p.m. on a Brookfield Viscosimeter. Advantageously, the viscosity and the thixotropy of the materials are selected so that the materials will flow under the influence of gravity and will become substantially more flowable as they pass beneath a doctoring edge during advancement of the dielectric substrate. The viscosity and the thixotropy of the conductive plastic material also determine how much a coating of the material will spread out laterally at its edges, during and after the doctoring operation. Consequently, the amount of edge taper of the coatings and the interfacial contact between each are also affected. The greater the viscosity and/or the thixotropy, the less the spread and the shorter the edge tapers.

It has been found that materials with viscosities below about 1,000 as determined above cannot be used to simultaneously produce electrical junctions between adjacent coatings which have the edge-like character of those obtained by the subject invention. In this regard it will be understood that materials have viscosities between 1,000 and 3,000 centipoises at a spindle speed of 10 r.p.m. Brookfield, may in some cases be suitable for this type of appplication technique. However, this range of viscosity particularly those with low thixotropy may not consistently produce the desired results. Materials having viscosities of the range used in spraying, i.e., from about 200 to 1,000 centipoises (10 r.p.m. Brookfield) usually intermingle from one zone of doctoring to the other during simultaneous application to the substrate. Consequently there is no uniform and distinct line of demarcation, i.e., an edge-like electrical junction between one coating to another. Such viscosities therefore are unacceptable for the production of simultaneous one-pass resistive coatings. For example, if a sprayable-type conductive polymeric material with a viscosity of about 300 cps. at 10 r.p.m. is applied to form a resistive element having two micro-thin coatings, i.e., a termination coat and a resistor coat, in accordance with the simultaneous doctoring method of the invention, the unevenness or jump-off of the transition zone from one coating to the other will be non-uniform and produce a change in resistance on the order of 20% of the total resistance across the two coatings. In contrast by the use of conductive polymer materials having higher viscosities, e.g., 3,000 centipoises or more, the amount of jump-off or unevenness will be substantially less, i.e., on the order of about 2½% of the total resistance across the micro-thin coatings on the resistive element. Advantageously such low viscosity materials may be used in the successive formation of the adjacent coatings.

It will be recognized that the viscosity and thioxotropy of the conductive plastic material is governed by its composition. This material contains finely divided electrically conductive particles dispersed uniformly throughout a substantially non-conductive heat curable polymeric vehicle. The polymeric vehicle must adhere to the dielectric substrate during the doctoring operation and provide a hard solid matrix in which the conductive particles will remain dispersed after curing at elevated temperatures. Examples of suitable polymeric materials include heat curable melamine-formaldehyde condensates, urea-formaldehyde condensates, methylated melamine-formaldehyde condensates, methylated urea-formaldehyde condensates, butylated melamine-formaldehyde condensates, butylated urea-formaldehyde condensates, phenol-formaldehyde condensates, ammonia-formaldehyde-hydrochloric acid condensates, ethylene diamine-formaldehyde condensates, hexamethylene diamine-formaldehyde condensates, epoxy resins and epoxy-modified phenolic resins and mixtures thereof. It will be appreciated that several of these heat curable polymeric materials require hardeners or catalysts to accelerate the curing reaction.

Moreover, certain combinations of these polymeric materials will cross-link with each other. Epoxy resins will cross-link with phenol-formaldehyde condensates and also with melamine-formaldehyde condensates. It will be understood that the phenol formaldehyde resins employed by this invention are those phenolic resins which include heat fusible, phenolic novolak resins and the heat curable, one-step phenolic resins. The novolaks usually are prepared by using a molar ratio of formaldehyde to phenol of less than about 1 to 1 in the presence of a catalyst that is preferably acidic under appropriate reaction conditions. Novolaks are permanently fusible and soluble and do not themselves pass into a cross-linked state.

In order to make the novolak resin infusible and capable of being cured by heat, it must be further reacted with an aldehyde donor or a source of methylene bridges or linkages. The methylene bridges may be provided by compounds which generate formaldehyde which in turn subsequently provides additional methylene bridges between adjacent phenolic nuclei.

The one-step phenolic resins are prepared with a larger mole ratio of formaldehyde to phenol than is employed to prepare the novolaks. Under the influence of alkaline catalysts, phenol reacts with aqueous formaldehyde to attach hydroxymethyl (methylol) groups to form one to all three of the phenolic ortho and para positions with or without the establishment of methylene linkages between phenolic nuclei. Suitable phenolic resins which are commercially available include Bakelite BKS 2710, Varcum 1281 B 65, and BRPA 5570. These resins may be cured to the thermoset (cross-linked) condition by the application of heat alone, but this cure often does not proceed rapidly enough. Consequently hardener compounds may be used to accelerate the rate of cure.

The hardener compounds capable of being aldehyde donors include hexamethylene-tetramine, paraformaldehyde, sym-trioxane and the like. Preferably the hardener is hexamethylenetetramine which is a product of ammonia and formaldehyde. These hardener compounds are considered aldehyde donors in that they effect rapid cross-linking of heat fusible novolak resins and the one-step phenolic resins with methylene or equivalent linkages by the application of heat.

Suitable epoxy-modified phenolic resins are exemplified by those made commercially available by Reichhold Chemicals, Inc. and sold as Plyophen 23–983.

The epoxy resins suitable for this invention include polymeric reaction products of polyfunctional halohydrins with polyhydric phenols. Such resins are known in the art as "epoxy," "epoxides," "glycidyl ethers" or "ether-epoxides." Among the polyfunctional halohydrins that may be employed to produce the epoxy resins are epichlorohydrin, glycerol dichlorohydrin and the like. Typical polyhydric phenols are the resorcinols and the 2,2-bis (hydroxyphenyl) alkanes, i.e., compounds resulting from the condensation of phenols with aldehydes and ketones including formaldehyde, acetaldehyde, propionaldehyde, acetone, and the like. The epoxy resins often contain terminal epoxy groups but also may contain both terminal epoxy groups and terminal hydroxyl groups.

Many different commercially available epoxy-type resins may be employed to prepare the conductive plastic materials of this invention. These resins include the epoxy resins marketed by the Bakelite Company under the trade names "ERL 2774" and "ERL 3794," the Epon resins sold by the Shell Chemical Corporation, i.e., Epon 1001, Epon 1004, Epon 1007, Epon 1009, and Epon 828, those sold by Ciba Company, Inc., designated as Araldite 6010 and 6020, and the GenEpoxy Resins sold by General Mills Chemical Division, i.e., GenEpoxy 175, 190, and 525.

In addition to the conventional epoxy resins, other epoxy intermediates and modified epoxy resins may be employed to produce the self-adhering coating compositions of this invention. "Unox Epoxide 201," a product of Union Carbide Chemicals Company, is representative of the new cycloaliphatic epoxy resins that are useful. The modified epoxy resins often contain reactive diluent such as styrene oxide, octylene oxides, allyl glycidyl ether, butyl-glycidyl ether, phenyl glycidyl ether, and the like reactive compounds in amounts varying up to about 20 to 30 parts of diluent per 100 parts of the epoxy resin. Examples of such modified epoxy resins that are commercially available are Bakelite ERL 2795, ERL 4289, ERL 2774, Araldite 502, GenEpoxy M–180, and Epon 815. It will be appreciated that the term "epoxy resin" as herein employed is meant to include the conventional epoxy resins hereinabove described and also those modified epoxy resins and intermediate epoxy resins.

It will be understood that the amount, type and size of the conductive particles used in the flowable conductive plastic materials determines the conductivity of the material. Because of their varied conductivity, carbon particles have been found to be particularly effective for producing resistive coatings. The carbon particles will comprise from about 4 to about 60% by weight of the conductive plastic coating material. Preferably, from about 7 to about 30% by weight of the carbon particles are employed. When the carbon particle content is above 60% by weight, the viscosity of the coating material is often too high for effective application by the doctoring techniques of this invention. Below a carbon particle content of about 7% by weight, the polymeric voids formed between the carbon particles after curing or cross-linking of the polymeric vehicle have an adverse effect on the electrical characteristics of the coating. For example, it has been found that the noise level of the resistive coating will be excessively high and therefore not commercially acceptable at this low carbon content.

It has been found that metal particles such as those of silver, platinum, other noble metals, copper, stainless steel and the like may also be used as conductive particles in the coating material of this invention. Such metal-containing materials are especially useful for forming the terminations of a resistor element. Depending on the metals employed and the resistivity desired, the metal particle content may be in amounts from 30% up to 50% by weight of the conductive plastic material. This range is especially suitable for producing a termination zone having a resistance that is less than 1% of the total resistance of the resistor element. It will be appreciated that lower amounts of the metal particles, e.g., 5% by weight or higher amounts of the metal particles, e.g., 65% may be also used for producing different resistive coatings.

Metal particles have a less pronounced effect on the viscosity of the conductive plastic materials. The primary consideration which determines the maximum amount of metal particles used is capability of the polymeric vehicle in the plastic material to adhesively bond the particles to the substrate to be coated. In general, from 0.25 to 1 part by weight of polymeric vehicle is required to 1 part of metal by weight.

Conductive plastic coating materials containing either all carbon or all metal particles are normally used, but mixtures of each or of both may be used.

The carbon particles used may be in the various forms, i.e., crystalline or amorphous, found in commercially available carbons such as acetylene blacks or furnace blacks. Often the carbon particles are calcined in air at eelvated temperatures on the order of 2,000 to 3,000° F. for several hours prior to use in the preparation of the conductive plastic materials. The carbon particles may range in size from 10 to 400 millimicrons and mixtures of larger and smaller particles may be used.

Metal particles, on the other hand, are usually considerably larger than carbon particles and may have particle sizes ranging from about 10 to 400 microns.

It will be appreciated that the resistivity of the conductive particle containing plastic material is determined by the amount of conductive particles used; the resistivity varying inversely to the amount of particles.

Because many of the thermosetting polymers or mixtures thereof used as the vehicle or binder for the conductive particles will have viscosities which are higher than desired for the purposes of the invention, it is often necessary to use an organic compound, which is a solvent for the polymer, to regulate the viscosity of the conductive plastic material. These solvents should be non-reactive with the polymeric vehicle and must be sufficiently volatile to be removed from the applied coating by evaporation. Exemplary of suitable solvent materials are aliphatic ketones such as methyl ethyl ketone, methyl isobutyl ketone and the like, as well as aromatic hydrocarbons such as benzene, toluene, the xylenes and the like. Since, as heretofore noted, the solvents are primarily used to regulate the viscosity of the conductive plastic materials, the amount of solvent may vary considerably, i.e., from about 5 to 70% by weight of the conductive plastic material to be applied to the substrate.

It will be understood that various additives and other compounding aids may be used in preparation of the conductive plastic materials in order to facilitate their application onto a dielectric substrate. For example, it has been found that silicone oils and other similar surfactants may be employed to prevent the occurrence of surface imperfections in the coating. Usually such additives will comprise a relatively small amount, i.e., about 1 to 5 parts by weight of the conductive plastic material. Also catalysts and hardeners for the polymeric vehicle as heretofore described will be added during compounding of the coating materials.

It will be recognized that some polymers chemically suitable for purposes of this invention can be used only if they have a viscosity suitable for the intended mode of application or if they can be blended with another polymer to produce this viscosity.

The substrate or base to be coated in accordance with this invention is a dielectric, insulating material which must be stable under the conditions required for fixing the coatings to the surface of the substrate. Examples of some of these materials are sheets, strips, films and the like formed from polymers, e.g., phenolic resins, polyvinyl chloride, polyethylene epoxy resin, and the like; glass, ceramics, treated papers and the like. It will be appreciated that the substrate may be advanced to the doctoring edge as successive sheets or strips in end-to-end abutment or as a continuously flexible film which may be withdrawn on a take-up roll.

Advantageously, the substrate can be coated at various rates of application. Generally the substrate is advanced at a substantially uniform rate along a prescribed linear path at speeds of from about 5 to about 60 feet per minute.

In accordance with this invention, the manner in which the individual coatings of conductive plastic material are applied to the dielectric substrate is particularly critical in obtaining the unique, smooth, electrical transition zones between adjacent coatings. Advantageously, different doctoring techniques and apparatus may be used to form the side-by-side coatings of this invention. In one embodiment of the method, two or more of the flowable conductive plastic materials are simultaneously doctored onto a moving dielectric substrate. In this method, separate masses of each of the materials are initially supported closely adjacent to each other on the substrate. The adjacent masses are separated, for example, by thin partition walls positioned above the substrate and means are provided on each of the walls for inducing the adjacent portions of the masses to flow together in edge overlays at the common junction point between the masses just prior to doctoring (of the masses and the material at the junction point) to form a plurality of side-by-side micro-thin coatings on the substrate. An apparatus particularly suitable for carrying out this doctoring procedure is described in applicant's application filed concurrently herewith and entitled "Apparatus for Simultaneously Applying a Plurality of Coatings to a Substrate."

In brief, this aspect of the invention comprises the steps of continuously advancing a dielectric substrate along a prescribed path, supporting two or more masses of the flowable conductive plastic material simultaneously on confined portions of the substrate in close but separate proximity to each other, inducing the adjacent portions of the masses of plastic materials to flow together in edge overlap and thereby form an edge-like electrical junction therebetween and, thereafter simultaneously doctoring the masses of material to an even thickness on the substrate as it advances away from the supported masses.

The masses of plastic materials are doctored onto the dielectric substrate to produce micro-thin coatings having thicknesses of from about 0.5 to about 20 mils. Because of the solvent usually present in the conductive plastic material, the coatings will be thinner after removal of the solvent, e.g., by drying. The doctored wet coatings may shrink as much as about 60% or more after being dried and fixed to the substrate. Consequently, the solvent-free coatings may have thicknesses varying from about 0.25 to about 10 mils.

After the coatings have been fixed to the substrate, resistor elements for the manufacture of potentiometers and other variable resistors may be produced by stamping, cutting or otherwise blanking out a plurality of resistive elements from the coated substrate. The manner in which these resistive elements are formed will be hereinafter described in greater detail.

Another doctoring method for producing a plurality of side-by-side, micro-thin conductive plastic coatings on a dielectric substrate involves the sequential or successive doctoring of two or more coatings on the substrate with the conductive junction between the coatings being provided by controlled overlapping of the coatings. Various procedures and apparatus may be employed to produce coatings in this manner. One apparatus for producing such coatings is described in applicant's application filed concurrently herewith and entitled "Apparatus for Successively Applying Coatings to a Substrate."

Accordingly, this invention also contemplates a method of producing side-by-side micro-thin conductive plastic coatings which comprise continuously advancing a dielectric substrate along a prescribed path, supporting a first mass of flowable conductive plastic material on a confined portion of the advancing substrate, doctoring a prescribed thickness of the mass to form a first micro-thin coating on the substrate as it advances away from said mass, heating the coating to convert it from a flowable to a non-flowable condition on the substrate, supporting a second mass of plastic material on another confined portion of the advancing substrate immediately adjacent to the first confined portion, doctoring a prescribed thickness of the second mass of conductive plastic material to form a second micro-thin coating, in edge-overlapped relation to the first coating on the substrate as it advances away from the second mass, and controlling the location of the second mass so that the edge-overlap formed between said coatings forms an edge-like smooth electrical junction therebetween.

Thus, in accordance with this invention, it has been found that sequential or successive doctoring of micro-thin coatings will also produce a plurality of coatings having the desired edge-like electrical junctions therebetween by controlling the edge-overlap of adjacent portions of the coatings during the doctoring operation. The amount of edge-overlap, i.e., the positioning of coating of the conductive plastic material over a previously formed micro-thin coating can be varied considerably, e.g., the overlap may extend from about .0010 to about .050 inch or more. This edge-overlap produces a transition zone between the two conductive coatings which has exceptionally smooth change in resistance, i.e., the amount of deviation from the desired change in resistance may be negligible, i.e., less than 1% up to 2½% of the total resistance of the resistor element. It will be appreciated that the amount of deviation to be controlled by proper selection of the viscosity of the conductive plastic material and the positioning of the supported masses of material on the substrate, and that in some applications a higher level of deviation, e.g., about 5%, may be suitable.

It will be understood that the side-by-side micro-thin coatings produced by this invention have substantially even thickness from one end of the coating to the other. The outer edge portions of these stripe coatings taper to a knife-like edge which extends linearly along the substrate, or the surface coated. The taper of these edge portions is affected by the viscosity and thixotropy of the conductive plastic material applied. In the embodiments of this invention in which one coating overlaps the other, there is formed a transition zone in which one tapered edge portion of one coating overlaps the tapered portion of the previously applied coating. In this manner there is a constant smooth electrical transition of one resistance to the other. Moreover, it will be appreciated that although the method of this invention has been specifically described with reference to the formation of two adjacent coatings, as many adjacent coatings as desired can be applied by this method.

It will be understood that in forming the resistive coatings suitable for producing resistor elements of this invention, it is necessary to insure that the resistances of each of the coatings and the resistance of the electrical junction formed between the coatings can be uniformly resolved, i.e., the resolution of the resistances across the coatings and the junction must be kept acceptable for the intended application. The term "resolution" as used herein refers to the physical characteristic of the resistive coating to provide a surface from which the resistance can be accurately determined as it is traversed by a contact member. For example, in producing a plurality of side-by-side micro-thin coatings suitable for a resistor element of a potentiometer, it is necessary to apply adjacent coatings of such thicknesses that the wiper or other contact element which is pressed against the surface of the resistor element will remain in full contact with the surface as it passes from one coating to another. Theoretically, point contact can be obtained even across an irregular surface. However, in a practical sense, this is not true. Each of the doctored coatings has a relatively smooth surface. Consequently, these surfaces have excellent resolution. The relative thickness of the adjacent coatings on the dielectric substrate, however, will greatly determine whether the junction between the coatings can be resolved by a contacting member. The difference in thickness of the coatings produced should provide a smooth change from one to the other. Generally, it has been found that the adjacent coatings may have doctored thicknesses in a ratio as high as about 5 to 1 and still provide excellent resolution for resistor elements used in a potentiometer. It will be appreciated that this ratio is dependent on the spreadability of the coatings and resulting edge tapers. Consequently, higher ratios may often provide acceptable resolution.

BRIEF DESCRIPTION OF THE DRAWINGS

Additional advantages of the method of this invention for producing a plurality of micro-thin resistive coatings on a dielectric substrate will become more apparent from the following description of its preferred embodiments and with reference to the accompanying drawings in which.

In the figures, like reference numerals designate like elements.

DESCRIPTION OF PREFERRED EMBODIMENTS

Figure 1:
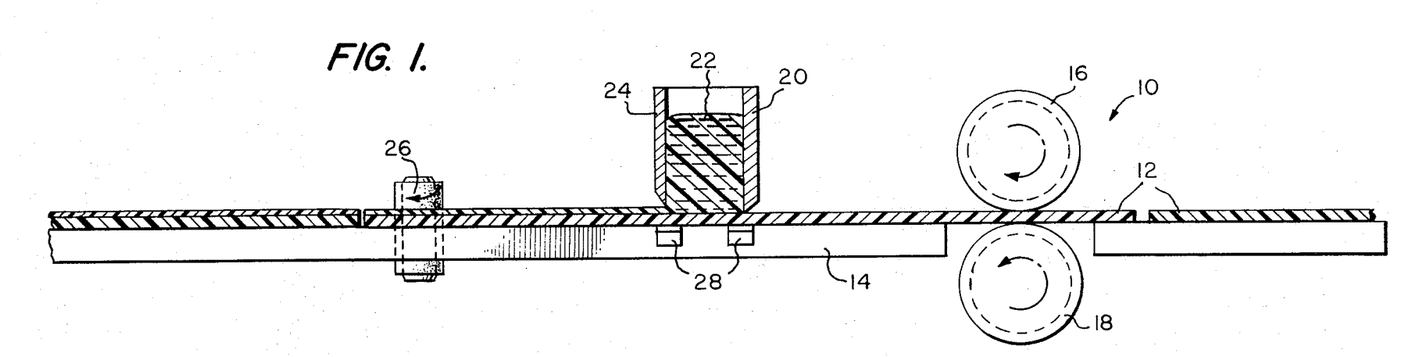
FIG. 1 is a schematic illustration in elevation and partly in section of an apparatus for carrying out the simultaneous application of two micro-thin resistive coatings onto a dielectric substrate, showing a guide track and roller means for advancing the substrate, a stripe coating applicator head for simultaneously applying two parallel stripe coatings, and a vertical edge roller for removing the coated substrate from under the applicator head.

Referring to FIG. 1, reference numeral 10, represents a coating apparatus for simultaneously and continuously applying to the surface of a dielectric substrate 12 two flowable plastic coatings in edge-overlapped relationship to each other. The substrate, in the form of a plurality of strips placed end-to-end, is continuously advanced along a linear path on the guide track 14 by a pair of horizontally disposed top and bottom feed rolls 16 and 18. Edge guide means (not shown) positioned on each side of the track and extending lengthwise thereof are provided for retaining the substrate in the guide track during its advancement through the apparatus.

The feed rolls are covered with a resilient material such as rubber so that they frictionally grip the substrate and move it at a substantially constant predetermined speed through the apparatus.

After passing between the feed rolls the strip of dielectric substrate is passed under a doctoring applicator head 20 maintained at a fixed position in relation to the track by appropriate support means. The applicator head, which has two adjacent dispensing compartments filled with different flowable conductive plastic materials (in this case, a phenolic resin containing silver flake and a mixture of an epoxy-modified phenolic resin and a phenolic resin containing carbon particles), serves to dispense simultaneously two coatings of the flowable plastic material onto the surface of the substrate. The flowable material in one of the compartments (i.e., the carbon-containing phenolic resins) is designated by reference numeral 22. A partition wall (not shown) separates the two compartments and is shaped at its forward edge with a double taper, one taper being vertical and the other being horizontal, with both meeting at a common point to induce flow of the different plastic material to a common junction therebetween. A doctor blade 24 which forms the front wall of both compartments closes off the compartments and has a tapered doctoring edge positioned above the substrate. The doctor blade is adjustably secured in the applicator head so that it can be raised and lowered to produce micro-thin coatings of varying thicknesses.

At left end of the guide track, as shown in the drawing, is a vertically disposed edge roll 26 for contacting the edge of the coated substrate after the substrate has passed under the applicator head. This roll serves to remove the coated substrate from the apparatus. This roll also has a soft surface such as a rubber coating.

It will be understood that roll 26 is coupled to a drive shaft which is operably connected to the drive means for turning feed rolls 16 and 18 so that the speeds of the rolls are coordinated.

Positioned under the bottom of the applicator head 20 and perpendicular to the longitudinal axis of the track 14 are two spring biased means 28 which support the substrate as it passes beneath the bottom of the dispensing compartments so that the upper surface of substrate is maintained at the same distance from the doctoring edge of the blade 24.

This apparatus as described in greater detail in the applicant's heretofore noted application entitled "Apparatus for Simultaneously Applying a Plurality of Coatings to a Substrate."

After being removed from the coating apparatus shown, the coated substrates are dried at elevated temperatures, e.g., 200° to 350° F. for a few minutes and then cured in an oven at higher temperatures for a period of one or more hours.

Figure 2:
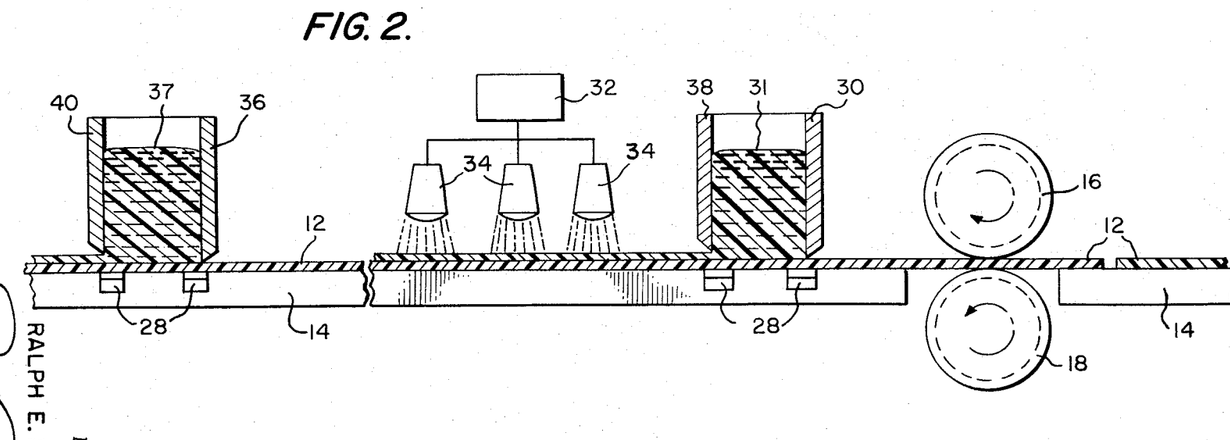
FIG. 2 is a schematic illustration also in elevation and partially in section of an apparatus for carrying out another embodiment of the method of this invention, namely the successive application of two micro-thin resistive coatings onto a dielectric substrate, showing a guide track and roller means for advancing the substrate successively to two stripe coating applicator heads that apply stripe coatings in edge-overlap relation to the substrate, with a heat curing means located therebetween.

FIG. 2 shows a coating apparatus for successively and continuously applying the flowable conductive plastic materials to the surface of the substrate in edge overlap relationship to each other. In this apparatus, pieces or strips of dielectric substrate 12 to be coated are again continuously fed flatwise on a guide track 14 with each piece being pushed longitudinally of the track and with the forward edge of each strip in engagement with the rearward edge of the preceding strip. While the feed rolls 16 and 18 continuously advance the strips one by one, the strips are held in predetermined positions by the guide means on the sides of the track. The upper surface of each of the strips of substrate, passes under a doctoring applicator head 30 where the top surface of the substrate receives a first stripe coating of conductive plastic material 31 (a phenolic resin containing silver flake) and then passes through heating section 32 where the surface of the coating is partially heat cured by heat lamps 34 to convert the flowable material to a non-flowable condition. Then the substrate is passed under the second applicator head 36 where it receives a second stripe coating of material 37 (carbon-containing phenolic resins) parallel to the first coating (and the edge of the substrate) with one edge of the second coating overlapping the adjacent edge of the first coating to form a thin overlap therebetween.

Spring biasing means 28 again maintain the substrate in its proper relationship with the bottom of applicator heads 30 and 36, and the sharp doctoring edge of each of the doctor blades 38 and 40 assures that each coating is of the prescribed thickness.

The inner side walls of dispersing compartments of the heads 30 and 36, i.e., the side walls which are positioned over the center portion of the substrate, are aligned in substantially line-on-line relationship to cause the flowable conductive plastic materials to be supported on the surface of the substrate with sharply defined linear edges, and the doctor blade produces a prescribed thickness in each coating so that a precise and sharp electrical junction therebetween is formed. Consequently, upon curing, the electrical junction provides a smooth transition in changing from the resistance of one of the coated surfaces to the other. It will be understood each knife-edge doctor blade produces a coating having an even thickness from one end of the strip to the other as the strip passes under each applicator head. Also, the feed rolls and an edge roll at the exiting end of the apparatus (not shown), causes the strips to be fed at a constant continuous rate during the doctoring operation. After each strip of the dielectric substrate has been coated and passed from the apparatus, it is then dried and cured to fix the coatings on the substrate.

In order to simplify the illustration of this method of the invention, that portion of the apparatus where the second coating is applied has been broken away in FIG. 2 of the drawings along a different vertical parting plane, i.e., a plane which passes through the center of the second applicator head 36 and through the second coating applied alone. Consequently, the first coating which is applied to the forward side of the strip by applicator head 30, as seen in the drawings, is not shown in the broken away portion. It will be apparent that the coatings obtained by this method of application will look substantially the same to the viewer as those produced by the method illustrated in FIG. 1.

Figure 3:
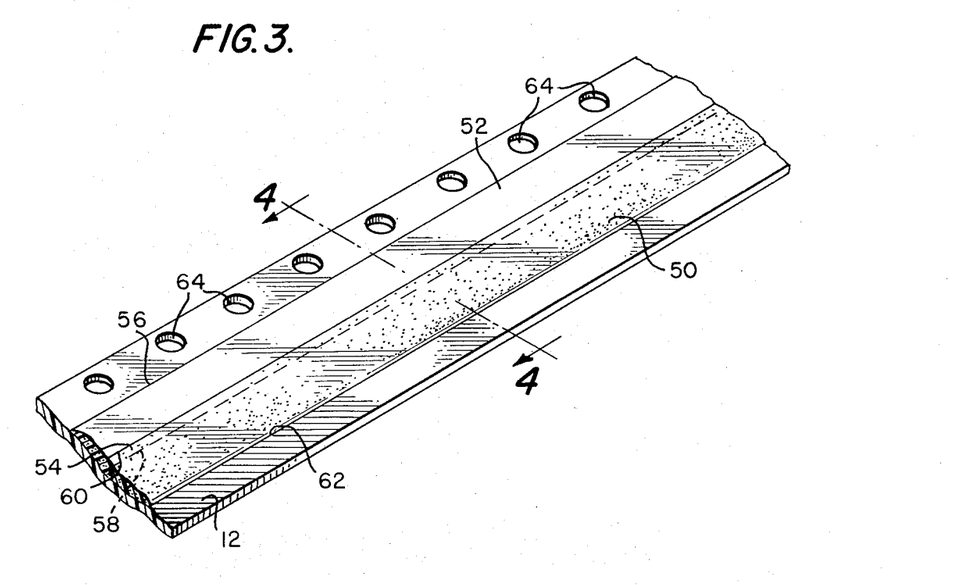
FIG. 3 is a schematic representation of a coated substrate produced in accordance with the method of this invention.

As illustrated in FIG. 3, the coated dielectric substrate comprises a substrate 12 having two micro-thin resistive coatings formed thereon; the carbon-containing coating 50 is in edge overlap relationship with the silver-containing coating 52 to provide a continuous electrical junction 54 between the coatings. Each of the coatings has linear edges 56, 58 and 60, 62 respectively, extending parallel to the edges of the substrate.

To facilitate positioning of the coated substrates during the subsequent manufacture of sector-shaped resistor elements or segments, it is advantageous to provide a series of indexing holes 64 along one of the edges of the substrate. These holes or openings are used to align the substrate in a blanking die for cutting out each of the individual resistor elements from the coated substrate. These elements are shown in greater detail in FIGS. 6 and 7.

Figure 4:
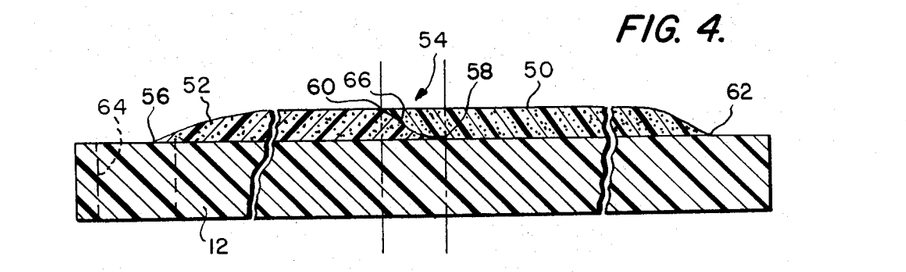
FIG. 4 is a cross-section of the coated substrate of FIG. 3, taken along line 4—4, schematically showing an enlarged view of the edge overlap produced by simultaneously applying two resistive coatings to a dielectric substrate.

In FIG. 4, there is shown a cross-section of a typical dual coated substrate obtained by simultaneously applying two conductive plastic materials to the substrate in accordance with the method of this invention. The silver-containing coating 52, as shown, is overlapped by the carbon-containing layer 50.

The metal-containing coatings apparently because of their flow characteristics often tend to flow beneath the carbon-containing coatings during the doctoring operation. It will be also noted that the coatings on the substrate are of the same thicknesses across the width of the substrate and that the sides of each coating taper to fine knife-like edges which extend linearly along the length of the substrate. The electrical junction or transition zone between the two coatings, which has been set off by two parallel dash-dot lines, is defined by the linear edges of each of the coatings. Thus, in the junction 54 the coatings each have a reversed taper with a continuous interface 66 extending from the edge of one of the coatings to the edge of the other coating.

In zone 54, the resistances of the tapered portions of each of the coatings combine to form the total resistance of the electrical junction. The resistance at each point across the junction can be considered as the summation of two resistors connected in parallel, each tapered portion providing an electrical path having a changing resistivity, one increasing and the other decreasing. Thus, in resolving the electrical resistance across the coated substrate, a wiper element in passing from the silver-containing termination zone provided by coating 52 through the electrical junction 54 to the carbon-containing resistive zone provided by coating 50 would first measure the resistance of the silver particles alone. Then the wiper element would measure the resistances of the tapered portions of each of the two coatings in the electrical junction and next the resistance of the carbon-containing coating alone. Since the resistivity of the carbon is many times higher than that of the silver, the silver-containing coating provides only a small portion of the total resistance across the entire substrate.

It will be appreciated that the electrical junction 54 formed by simultaneously applying two coatings will initially have a wet thickness the same as each of the separate coatings. It is believed that the shrinkage of the coating which occurs after drying and curing is dependent on the solids content of the conductive plastic materials used. Generally, in this coating method adjacent coatings have approximately equal amounts of shrinkage.

Figure 5:
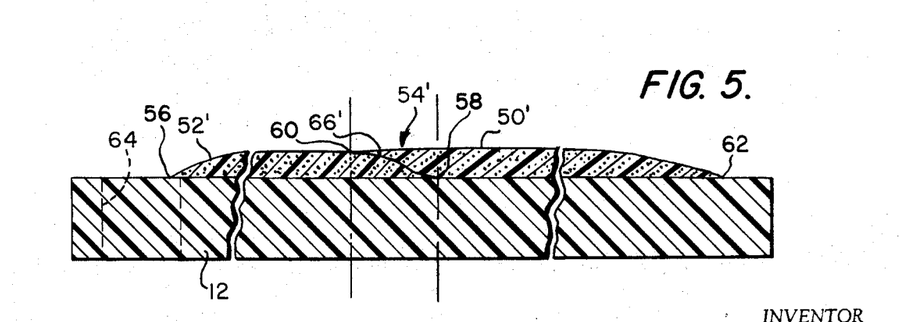
FIG. 5 is a cross-section of a substrate similar to that shown in FIG. 3 schematically showing an enlarged view of the edge-overlap produced by successively applying two resistive coatings to a dielectric substrate.

FIG. 5 schematically shows a coated substrate formed by successively applied coatings. In this case, the silver-containing coating 52' has been applied first and then precured by heating. Then the carbon-containing coatings 50' is deposited in edge overlapped relationship. It will be understood that in successive application of such resistive coatings, the amount of overlap will usually be greater since each coating can spread laterally at the junction without abutting the other. Moreover, since the first coating has previously been made substantially non-flowable, the second coating is actually applied over one of the edges of the first. Consequently, the tapered edges obtained can be controlled to provide exceptionally smooth electrical junctions between adjacent coatings.

However, in order to provide a smooth electrical junction in passing from a coating of low resistivity to a coating of substantially higher resistivity, e.g., from the silver to the carbon, it is essential that the resistivity of each point in the electrical junction should be greater than the resistivity of the coatings having the low resistivity, i.e., silver-containing coating. Conversely, when passing from a coating of high resistivity to a coating of low resistivity, the junction therebetween should always have a resistivity less than that of the coating with the higher resistivity. Moreover, another important aspect in the formation of these electrical junctions is that the surface characteristics of the junction must be such that a contact element can fully resolve the resistances of the resistive coatings as it travels across the coatings and the electrical junction. The surface, between one coating and another, should be substantially smooth, as shown in FIG. 4. In the method of applying coatings of different thicknesses successively, the physical differences in thicknesses between the adjacent coatings therefore should be regulated so that there is not an abrupt change in thickness from one coating to the other. Advantageously, the conductive plastic materials used by this invention form tapered edges and thus facilitate a smooth electrical junction between adjacent coatings. Nevertheless, it has been found that the edge overlap must be controlled so that the proper resolution of the resistance in the junction can be obtained. In order to provide such junctions, it is preferred that the edge of one coating which overlaps an adjacent edge of another coating overlap substantially the entire tapered portion of the adjacent edge. Thus, it will be understood that edge abutment of two tapered edges alone forms a depressed area or zone between the two coatings that does not provide the desired electrical junction with staisfactory resolution characteristics.

It will be recognized that the outer portions of the substrates in FIGS. 4 and 5 have been broken away to denote that the substrates are substantially wider than illustrated.

Figure 6:
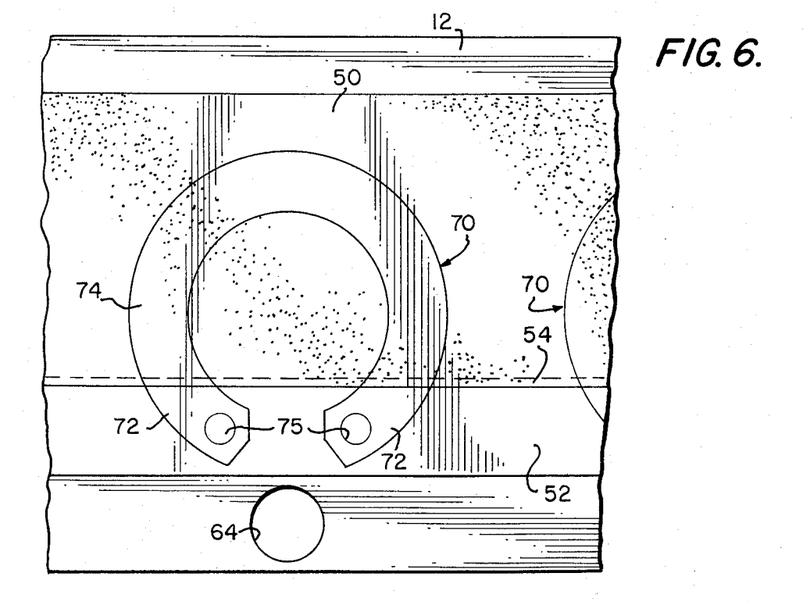
FIG. 6 is a plan view of a portion of a substrate coated with a silver-containing plastic material and a carbon-containing plastic material, showing a sector-shaped linear resistor element punched out of the substrate.

FIG. 6 shows a greatly enlarged plan view of a portion of the substrate 12 having the carbon containing coating 50 in edge overlap junction with the silver-containing coating 52 and the location of a sector-shaped resistor element 70 as it is blanked out of the substrate. It will be seen that the blanking die (not shown) is located with respect to the indexing or pilot hole 64 so that the resistor element is cut from the coated substrate in such a manner that metal termination zones 72 are provided at each of its ends by the silver-containing coating and a carbon-resistor zone 74 is formed by the carbon-containing coating.

The sector-shaped resistor element 70 provides a linear resistor for use with a potentiometer having a wiper element that traverses the element during rotation through 260°, i.e., from one termination zone 72 across the resistor zone 74 to the other termination zone 72. During this rotation, the wiper element will twice pass over the electrical junctions 54. The electrical deviation, or unevenness, occurring during the change from one zone to the other is commonly known as "jump-off" and occurs as the wiper element passes over the electrical junctions. This change is also known as "hop-on" during the initial transfer from the termination zone to the resistor zone and is known as "hop-off" when transferring from the resistor zone to the other termination zone. Advantageously, as heretofore described, the resistor elements of this invention are characterized in that they have smooth electrical junctions between the metal termination zones and the carbon resistor zones which are substantially less than those heretofore obtained by the application of only two adjacent coatings. Thus, it has been found that the amount of undesirable deviation or jump-off obtained will be substantially negligible, or as low as 2½ % of the total resistance across the resistor element. It will be understood that this extremely small deviation is particularly unique in the high quantity mass produced carbon-containing resistor elements. This is especially true in those elements having only two coatings at the junction.

During formation of the resistor element, small openings or holes 75 are provided in each end for the electrical terminals of a potentiometer assembly.

Figure 7:
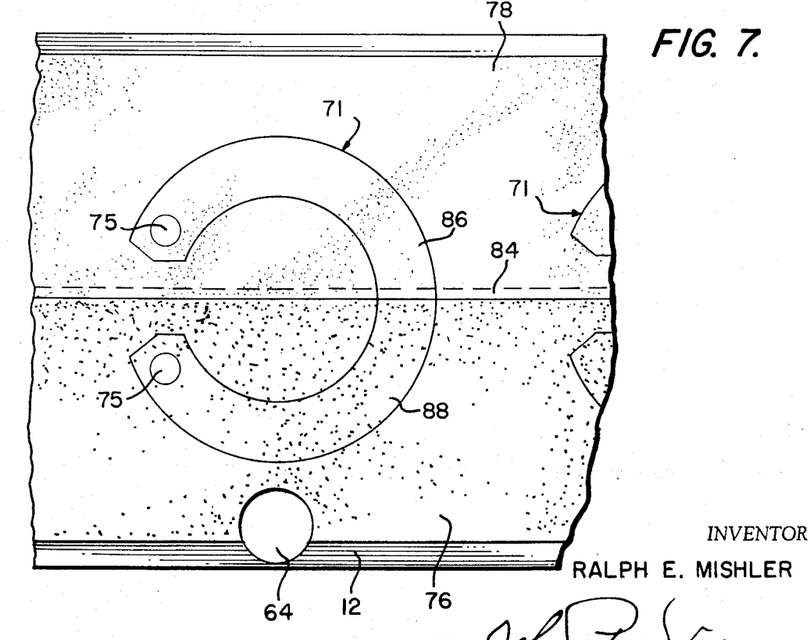
FIG. 7 is a plan view showing a portion of a substrate coated with two carbon-containing plastic materials having different resistivities and a sector-shaped non-linear resistor element punched out of the substrate.

The manner in which non-linear resistor elements are produced in accordance with this invention is illustrated by FIG. 7. The high resistance carbon-containing coating 76 was first applied to a strip of the substrate 12 by passing the strip beneath a single dispensing compartment of a doctoring applicator head of the type shown in FIG. 2. The coating was then precured at an elevated temperature, e.g., 300° F. for a few minutes and the strip next passed under a doctoring applicator head containing another carbon-containing plastic material to apply a second carbon-containing coating 78 of lower resistivity, the two coatings overlapping substantially along the center line of the strip. Subsequently, the strip was heated to cure the coatings.

The strip was then placed in a blanking die so that the blanked-out configuration of the resistor element is rotated about 90° with respect to the position shown in FIG. 6. The electrical junction 84 between the coatings is located approximately at the point of 50% rotation, i.e., that point which is positioned midway between the ends of the resistor element 71.

It will be understood that the blanking die can be rotated so that the electrical junction between the adjacent coating may be located on different portions of the resistor element. Consequently, the overall result is to provide a carbon-containing resistor element having two zones of different linear resistance, i.e., zones 86 and 88, joined by a non-linear zone or junction 84. Moreover, the length of the edge overlap, i.e., the width of the transition zone can be increased so that the reversed taper of each edge is considerably extended. This results in the formation of a wide zone of non-linearity on the resistor element. For example, an overlap of about .030 of an inch or more has been found to be particularly effective for the production of non-linear resistor elements.

The method of this invention, the coated substrates, and the unique resistor elements produced thereby will be further understood by reference to the following examples:

EXAMPLE I

This example illustrates the method for producing a resistor element for use in a potentiometer by the simultaneous application of two resistive coatings to a dielectric substrate using an apparatus of the type illustrated in FIG. 1. A plurality of dielectric strips of a phenolic resin sold by the Synthane Corporation, each having a thickness of about 0.020 inch and a length of approximately 28 inches, were successively passed at a speed of 6 feet per minute beneath a doctoring applicator head having two adjacent dispensing compartments with a vertical partition wall therebetween.

One compartment was filled with a carbon-containing plastic material having the following composition:

| Ingredients— | Percent by weight |
|---|---|
| Carbon particles [1] | 27.0 |
| Phenolic resin [2] | 29.5 |
| Epoxy-modified phenolic resin [3] | 17.2 |
| Methyl ethyl ketone | 6.0 |
| Isophorone [4] | 20.3 |
| | 100.0 |

[1] Mixture of air calcined Statex 93 and Conductex SC—products of Columbian Carbon.
[2] A 56% solids solution of a resin in ethanol—BKS 2710—product of Union Carbide.
[3] A 60% solids solution of resin in isopropyl alcohol—Plyophen 23-983—product of Reichhold Chemical.
[4] A cyclic ketone—product of Wisconsin Solvents.

The viscosities of this material at 23° C. are 352,000 cps. at 0.5 r.p.m. and 23,600 cps. at 10 r.p.m. on a Brookfield Viscosimeter.

The other compartment contained a silver-containing plastic material having the following composition:

| Ingredients— | Percent by weight |
|---|---|
| Silver flake [1] | 30.0 |
| Molybdenum disulfide powder | 25.0 |
| Phenolic resin [2] | 20.1 |
| Epoxy-modified phenolic resin [3] | 11.8 |
| Melamine resin [4] | 1.4 |
| Catechol | 0.4 |
| Isophorone [5] | 11.3 |
| | 100.0 |

[1] #750—product of Metals Disintegrating Company.
[2] Same as in above table.
[3] Same as in above table.
[4] Cymel 301—Product of American Cyanamid.
[5] Cyclic ketone—product of Wisconsin Solvents.

This material has viscosities at 22° C. of 420,000 cps. at 0.5 r.p.m. and 62,000 cps. at 10 r.p.m. on a Brookfield Viscosimeter.

The compartment filled with a carbon-containing conductive plastic material had a width of approximately 0.447 of an inch; whereas the compartment filled with a silver-containing conductive plastic material had a width of approximately 0.118 of an inch, both of the compartments having a length of approximately 0.5 of an inch. Two coatings of the plastic materials were applied to a thickness of 2.25 mils wet.

The resulting coated substrates were then dried for 4½ minutes at 300° F. and cured for one hour at 325° F. to secure the coatings to the substrates.

Photomicroscopic investigation of a sample of one of the resulting substrates showed that the edge overlap occurring between the two resistive coats was on the order of about 0.00275 of an inch.

A plurality of sector-shaped resistor elements, each having a resistance of 500 ohms, where cut out of the coated substrate by a blanking die so that the silver-containing plastic material formed two termination zones, one at each end of the element as shown in FIG. 6. Each element had an outer diameter of approximately 0.550 of an inch and a radial width of approximately 0.117 of an inch and an included angle of 62° between the centers of the terminal openings. This size element is suitable for use in Centralab Model 3 potentiometer (Centralab® is a trademark of Globe-Union, Inc.).

Figure 8:
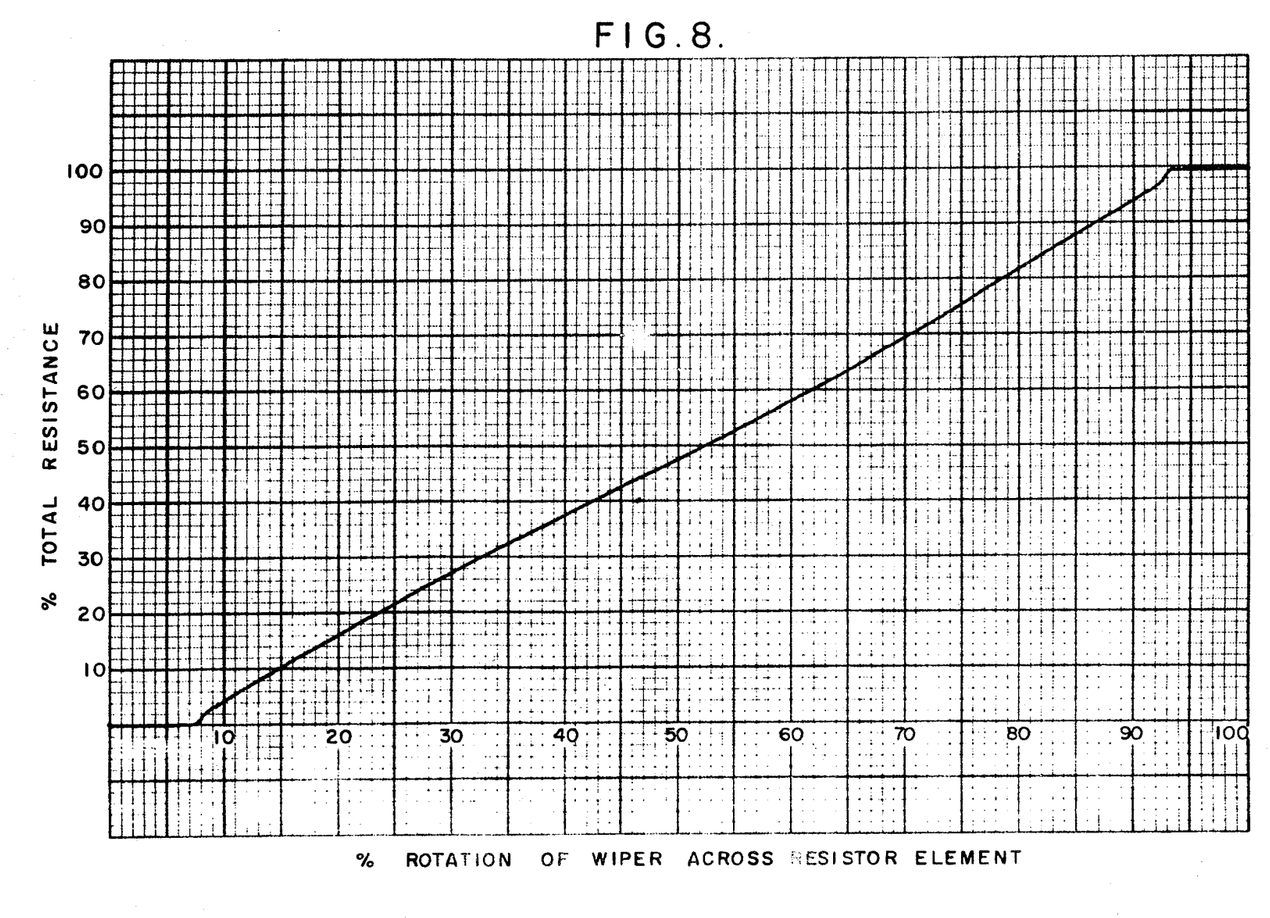
FIG. 8 is a potentiometer test plot showing the change in resistance across a linear resistor element produced by simultaneously applying two relatively high viscosity coatings to a substrate in which the "jump-off" at the electrical junctions between the metal termination zones and the carbon resistive zone is about 2½%.

In order to evaluate the electrical characteristics of these resistor elements, potentiometer test plots were obtained by using a standard constant-voltage test procedure designated Centralab Specification No. 3BB-2. In this test procedure, the resistor element is placed in a Model 3 potentiometer assembly that is electrically connected to a constant voltage source and the variation in resistance obtained by rotating the wiper element to the assembly, across the resistor element, is plotted, i.e., the percent of the resistance across the resistive element is plotted against the percent rotation of the wiper element. As shown in FIG. 8, a resistive element produced in accordance with this invention, exhibited a "jump-off," i.e., a deviation in resistance, across the electrical junction between the resistive silver-containing coating and the resistive carbon-containing coating of approximately 2½ % of the total resistance encountered across the entire resistor element.

Also, upon examination of the resistor elements obtained at different locations along the phenolic strips, it has been found that the resistances of each were within a tolerance of ±5% from the desired value, i.e., 500 ohms.

EXAMPLE II

Another group of sector-shaped resistor elements, each having a resistance of about 560 ohms, were made by following the same procedure and by using the same conditions and apparatus employed in Example I with the exception that the silver- and carbon-containing plastic materials used had Brookfield viscosities of from about 200–300 cps. at 10 r.p.m. and 200–300 cps. at 0.5 r.p.m.

These low viscosity materials were obtained by adding additional solvent, i.e., methyl ethyl ketone to the carbon-containing plastic material used in Example I, and by preparing a silver-containing material having the following composition.

| Ingredients— | Percent by weight |
|---|---|
| Phenolic resin solution [1] | 20 |
| Isophorone | 5 |
| Silver flake [2] | 25 |
| Methyl ethyl ketone | 50 |
| | 100 |

[1] Durez #13832—product of Hooker Chemical Company.
[2] #750—product of Metals Disintegrating Company.

Figure 9:
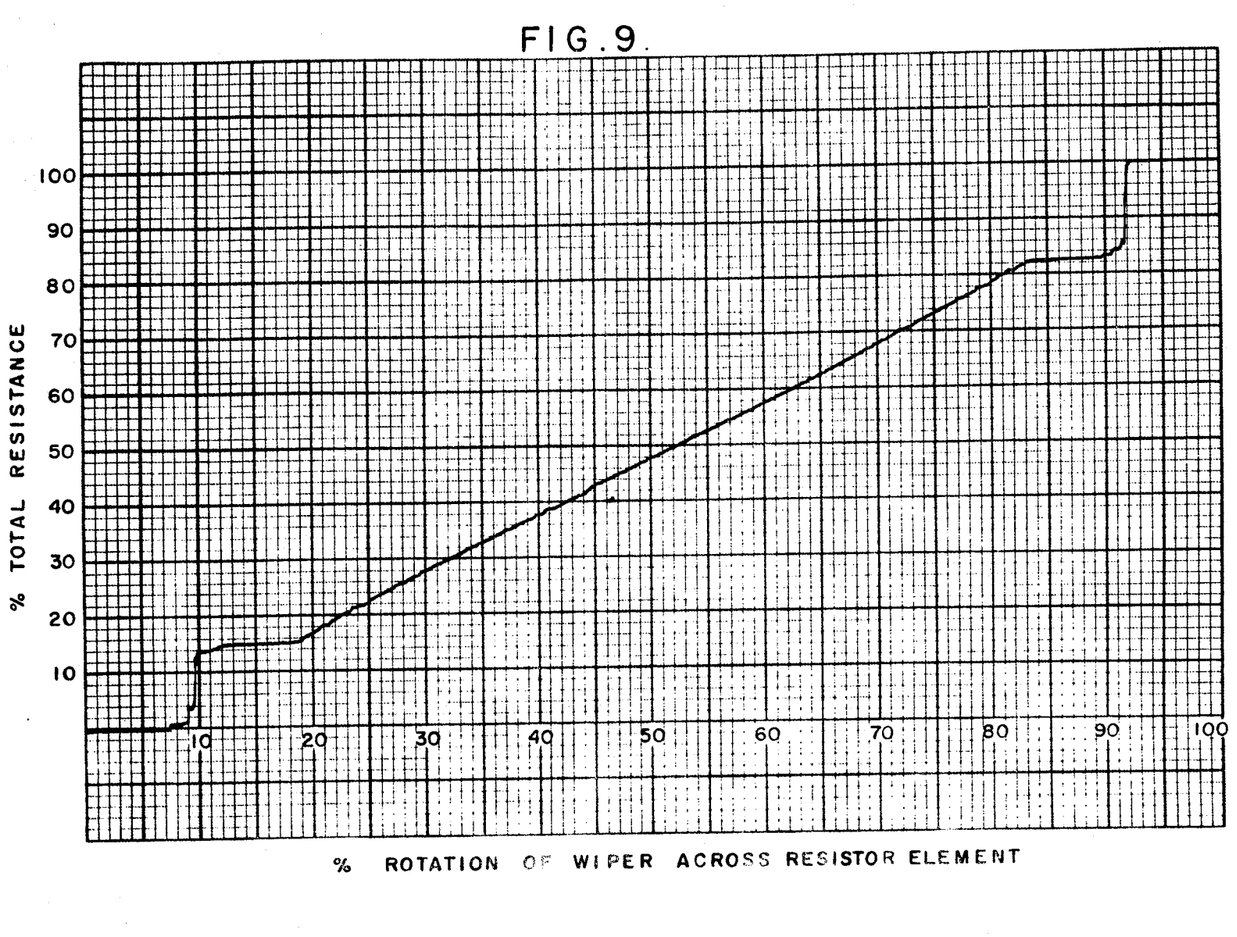
FIG. 9 is a potentiometer test plot showing the change in resistance across a linear resistor element produced by simultaneously applying two low viscosity coatings to a substrate in which the jump-off at the electrical junctions between the metal termination zones and the carbon resistive zone is as high as 18%.

As shown in FIG. 9, a constant-voltage plot of the resistance of one of the resistor elements obtained gave a "jump-off" as high as about 18% of the total resistance of the element; thereby showing the need for using higher viscosity materials for the simultaneous application of two or more adjacent resistive coatings. Also, the edges of the coatings at the junction were wavy and non-linear.

EXAMPLE III

This example illustrates the production of additional resistor elements having a resistance of 500 ohms for a Centralab Model 3 potentiometer by the successive application of a silver-containing plastic material and a carbon-containing plastic material to a dielectric substrate in an apparatus of the type shown in FIG. 2.

A plurality of dielectric strips of the type used in Example I, i.e., those made of phenolic resin having a dielectric strength greater than 1000 megohms, were first passed at a rate of 6 feet per minute beneath a doctoring applicator head with a dispensing compartment filled with a silver-containing plastic material having the same composition as the silver-containing material used in Example I.

This compartment had a width of about 0.188 of an inch and a length of about 0.500 of an inch, and the doctor blade was set to apply a coating having a thickness of 2.0 mils wet.

The coated strips were then successively heated to a temperature of about 300° F. for 4½ minutes to precure the first applied resistive coating.

A second coating of the carbon-containing material used in Example I was aupplied in edge overlap relation to the first silver-containing coating by passing the coated strips successively under a second doctoring applicator head. The coating applied had a thickness of 2.25 mils wet. The dispensing compartment of this head had a width of 0.477 of an inch and a length of 0.500 of an inch, and the inner wall of this dispensing compartment was placed line-on-line with the inner wall of the first dispensing compartment, the maximum overlap being about 0.002 of an inch.

The resulting coated strips were next precured for 4½ minutes at 300° F. and then cured for 2 hours at 325° F. Photomicroscopic examination of the electrical junction produced between the coatings revealed that the amount of overlap was about .015 of an inch.

Evaluation of the sector-shaped resistor elements cut from these strips again showed that the resistances were within a tolerance of ±5%.

Figure 10:
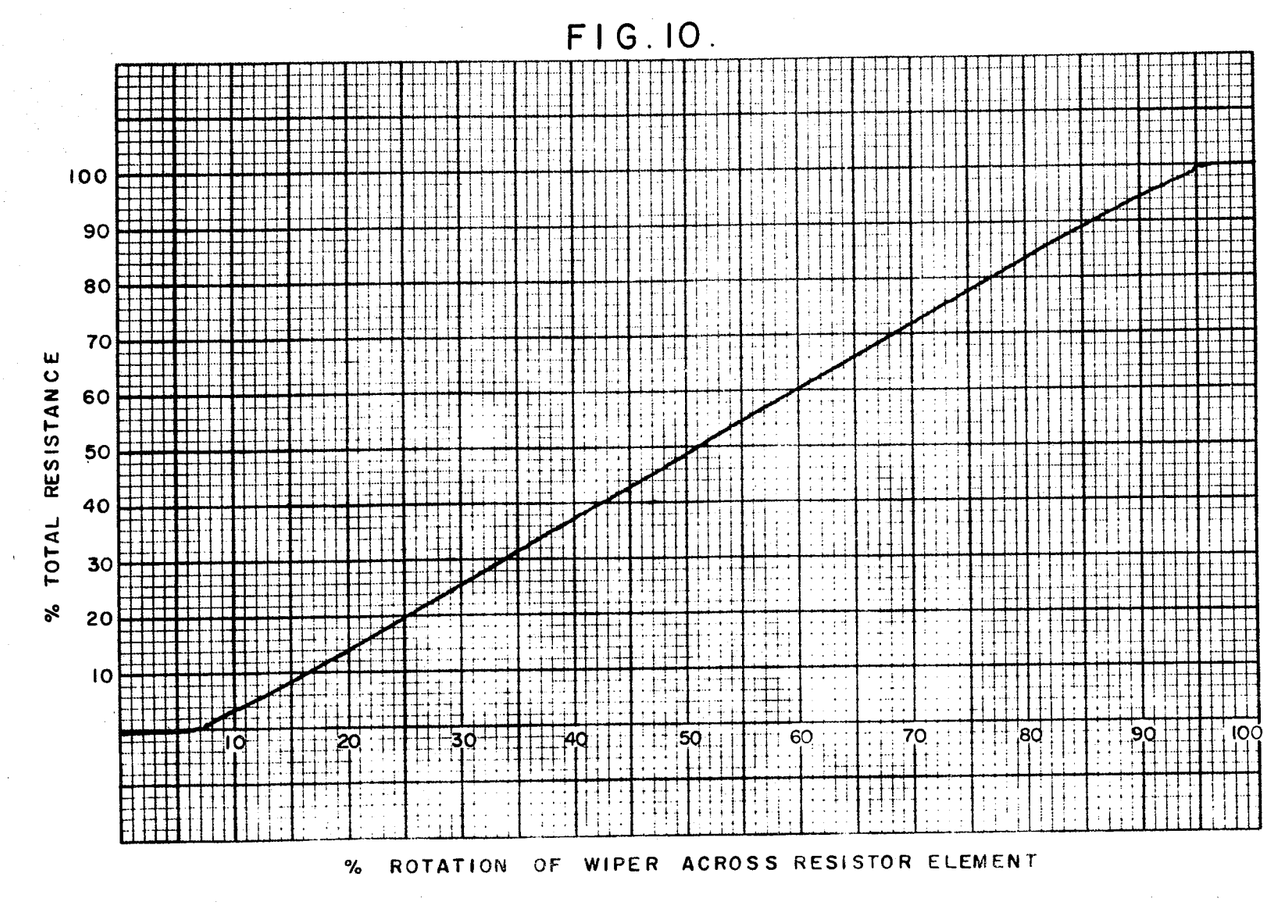
FIG. 10 is a potentiometer test plot showing the change in resistance across a linear resistor element produced by applying two successive coats to a substrate in which the jump-off at the electrical junctions between the metal termination zone and the carbon resistive zone is less than 1%.

As shown in FIG. 10, a potentiometer test plot of one of these resistor elements gave a "jump-off" between the silver termination zones and the carbon resistor zone of less than 1% of the total resistance.

EXAMPLE IV

A plurality of non-linear resistor elements of the size used in a Centralab Model 3 potentiometer were produced by using the successive coating method described in Example III, and employing an apparatus of the type illustrated in FIG. 2. In this case, additional strips of the phenolic resin heretofore employed were passed successively at a speed of 6 feet per minute under a doctoring applicator head which applied a first high resistance coating of a carbon-containing plastic material to a thickness of 3 mils wet along one side of each strip. This carbon-containing material was a 1:1 blend by weight of a carbon-containing material having the same composition as that used in Example III, and a carbon-containing plastic material having the following composition:

| Ingredients— | Grams |
|---|---|
| Carbon-containing material used in Example III | 300 |
| Blend of 63.2% by weight phenolic resin [1] and 36.8% by weight of epoxy-modified phenolic resin [2] | 73 |

[1] A 56% solids solution of a resin in ethanol—BKS 2710—product of Union Carbide.
[2] A 60% solids solution of resin in isopropyl alcohol—Plyophen 23-983—product of Reichhold Chemical.

The dispensing compartment in this applicator head had a width of 0.477 of an inch and a length of 0.500 of an inch.

The coated strips were then precured for 4½ minutes at 300° F.

The strips were then coated along their other sides with low resistance carbon-containing material by reverse feeding the strips into the same coating apparatus, i.e., the strips were turned around and fed back in end-to-end abutment with the coated surface up under the same doctoring applicator head. The edges of the strips were guided in registry with the edge guide means along the guide track so that the amount of edge overlap between the first and second coatings was about 0.030 of an inch. In applying the second coating, the dispensing compartment of the head was filled with the same type of carbon-containing plastic material used in Example III.

Sector-shaped non-linear resistor elements having a total resistance of 500 ohms were then cut from the carbon coated strips by orienting a blanking die with respect to the coated strips in a manner similar to that shown in FIG. 7.

Figure 11:
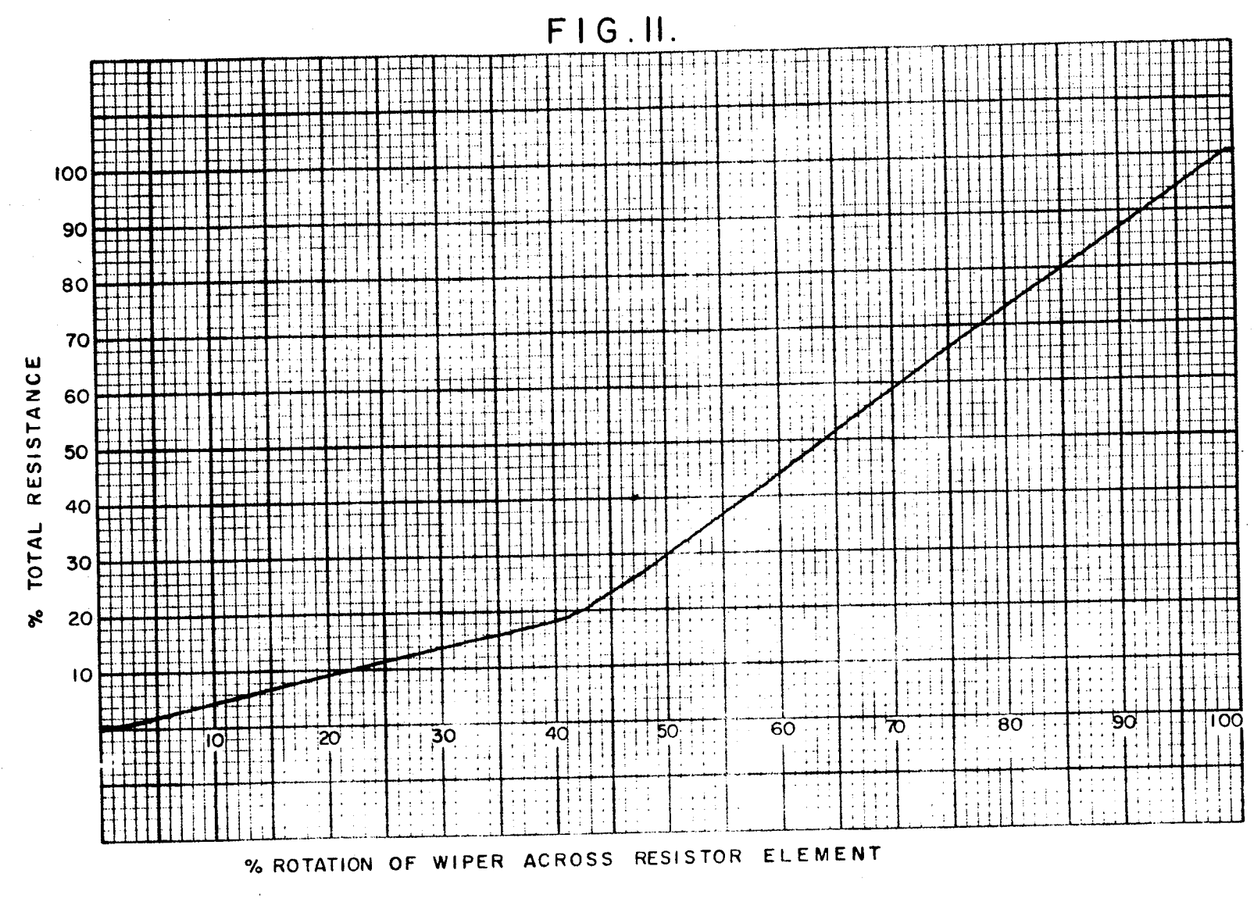
FIG. 11 is a potentiometer test plot showing the change in resistance across a non-linear resistor element produced by successively applying two carbon-containing coatings to a substrate.

A potentiometer test plot (obtained by following the test procedure outlined in Example I) for one of the resistor elements produced is illustrated in FIG. 11. It will be seen that the resistor element provides a non-linear resistance and that the transition zone between each of the linear portions of the curve, i.e., from the point of about 40% rotation to the point of about 45% rotation is exceptionally smooth and even.

From inspection of the above examples it will be seen that this invention provides unique methods for producing high quality resistor elements, especially carbon resistors, in which the electrical junctions between adjacent coatings have excellent resolution and exceptionally smooth change in resistance.

What is claimed is:

1. A method of providing a plurality of resistive coatings on a dielectric substrate used to make variable resistor elements which comprises continuously advancing a dielectric substrate along a prescribed path at a substantially uniform rate, supporting two or more masses of flowable plastic material having dispersed therethrough conductive particles simultaneously on confined portions of the substrate in close but separate proximity to each other, including the adjacent portions of the masses of plastic materials to flow together in thin edge overlap relationship having an abutting reversed taper and thereby form a thin edge-like overlapped electrical junction therebetween and, thereafter simultaneously doctoring the masses of material to form resistive coatings having even thickness on the substrate as it advances away from the supported masses; the viscosity of said conductive plastic materials being sufficient to form substantially linear edge overlap between the adjacent edges of the coatings without substantial intermingling of the conductive particles of one coating with the other along the electrical junction thus formed by the linear edge overlap.

2. The method of claim 1 in which said flowable plastic material has a viscosity of from about 1,000 to about 50,000 cps. at a Brookfield spindle speed of 10 r.p.m. and has an index of thixotropy of from about 1.5 to about 40.

3. The method of claim 1 in which said coated dielectric substrate has formed therefrom stamped-out resistor elements having said edge overlap normal to the wiped path of said variable resistor elements.

4. The method of claim 1 in which the substrate is advanced at a rate of from about 5 to about 60 feet per minute.

5. The method of claim 1 in which the micro-thin coatings are subsequently cured at temperature of from 200° to 400° F.

6. The method of claim 1 in which the micro-thin coatings are doctored to a wet thickness of from 0.5 to 20 mils.

7. The method of claim 6 in which the micro-thin coatings are doctored to a wet thickness of from about 0.5 to about 20 mils.

8. A method of successively producing a plurality of thin resistive plastic coatings on a substrate used to make variable resistor elements which comprises continuously advancing a dielectric substrate along a prescribed path, supporting a first mass of flowable plastic material having dispersed therethrough conductor particles on a confined portion of the advancing substrate, doctoring a prescribed thickness of the mass to form a first micro-thin resistive coating on the substrate as it advances away from said mass, heating the coating to convert it from a flowable to a nonflowable condition on the substrate, supporting a second mass of flowable plastic material having dispersed therethrough conductive particles on another confined portion of the advancing substrate immediately adjacent to the first confined portion and in thin edge overlap relation having an abutting reversed taper, doctoring an even thickness of the second mass of conductive plastic material to form a second micro-thin resistive coating on the substrate as it advances away from the second mass, and controlling the location of the second mass so that the edge overlap formed between said coatings forms an edge-like smooth electrical junction therebetween, and continuing this sequence of operations until the desired number of contiguous side-by-side coatings are produced; the viscosity of said conductive plastic materials being sufficient to form continuous substantially linear edges along each of the ocatings.

9. The method of claim 8 in which the flowable conductive plastic material has a viscosity of from about 200 to about 50,000 cps., at a Brookfield spindle speed of 10 r.p.m. and has an index of thixotropy of from about 1.5 to about 40.

10. The method of claim 8 in which said coated dielectric substrate has formed therefrom stamped-out resistor elements having said edge overlap normal to the wiped path of said variable resistor elements.

11. The method of claim 8 in which the first coating is heated sufficiently to effect a precuring of said first coating prior to applying said second coating.

12. The method of claim 8 in which the substrate is advanced at a rate of from about 5 to about 60 feet per minute.

13. The method of claim 8 in which the micro-thin coatings obtained after the last doctoring operation are subsequently cured at a temperature of from 200° to 400° F.

14. A resistor element formed from a dielectric substrate having a plurality of side-by-side resistive coatings deposited thereon, said coatings being electrically joined together across the length of the element normal to the wiped path formed by the surface of the coatings by edge-like electrical junctions, and each coating having continuous substantially linear edges extending across the width of the element and the junctions comprising zones in which one edge of a coating overlaps the edge of another coating in a reversed taper and provides a continuous interface between the coating from one end of the junction to the other.

15. The resistor element of claim 14 in which three coatings are deposited on said substrate, one of the coatings comprising a metal-containing plastic material, the second coating comprising a carbon-containing plastic material, and the third comprising a metal-containing plastic material, the coatings respectively providing a first termination zone, a linear resistor zone, and a second termination zone extending across the element to provide a smooth electrical transition from one coating to its adjacent coating by the reversed taper overlap between coatings.

16. The resistor element of claim 14 in which two coatings are deposited on said substrate, the one deposited coating comprising a carbon-containing plastic material of low resistivity and the second comprising a carbon-containing plastic material of high resistivity, said coatings providing a nonlinear resistance path across said element to provide a smooth electrical transition from one coating to its adjacent coating by the reversed taper overlap between coatings.

17. The resistor element of claim 14 in which the overlapped edge of one coating defines one end of the electrical junction and the overlapping edge of another coating defines the other end.

18. The resistor element of claim 14 in which each of the coatings has a different electrical resistivity, the electrical junctions each providing a resistivity such that when passing from a coating of low resistivity to a coating of high resistivity, the resistivity of each point in the electrical junction is greater than the resistivity of the coating having the low resistivity.

19. The resistor element of claim 14 in which a plurality of coatings are deposited on said substrate, the first and the last coatings comprising metal-containing plastic materials and the intermediate coatings comprising various carbon-containing plastic materials, said first and last coatings providing termination zones and said intermediate coatings together providing a non-linear resistance zone, said zones extending across the element.

References Cited

UNITED STATES PATENTS

| 3,379,567 | 4/1968 | Wright | 338—308 X |
| 2,766,482 | 10/1956 | Heibel | 118—415 X |
| 2,795,680 | 6/1957 | Peck | 338—307 X |
| 2,305,849 | 12/1942 | Dorn | 117—212 |

WILLIAM L. JARVIS, Primary Examiner

U.S. Cl. X.R.

117—226, 227, 105.3; 252—502, 503, 512, 513, 514; 338—308

UNITED STATES PATENT OFFICE
CERTIFICATE OF CORRECTION

Patent No. 3,676,212      Dated July 11, 1972

Inventor(s) Ralph Epharim Mishler

It is certified that error appears in the above-identified patent and that said Letters Patent are hereby corrected as shown below:

Column 18, line 63 - "including" should be --inducing--.

Signed and sealed this 20th day of November 1973.

(SEAL)
Attest:

EDWARD M. FLETCHER, JR.
Attesting Officer

RENE D. TEGTMEYER
Acting Commissioner of Patents